(12) United States Patent
Kiguchi et al.

(10) Patent No.: US 11,116,219 B2
(45) Date of Patent: Sep. 14, 2021

(54) METHOD FOR CONTROLLING DISCHARGE-TYPE MULTIDRUG RESISTANT PLANT DISEASES

(71) Applicant: SUMITOMO CHEMICAL COMPANY, LIMITED, Tokyo (JP)

(72) Inventors: So Kiguchi, Tokyo (JP); Satoshi Watanabe, Takarazuka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 135 days.

(21) Appl. No.: 16/606,383

(22) PCT Filed: May 18, 2018

(86) PCT No.: PCT/JP2018/019308
§ 371 (c)(1),
(2) Date: Oct. 18, 2019

(87) PCT Pub. No.: WO2018/212329
PCT Pub. Date: Nov. 22, 2018

(65) Prior Publication Data
US 2021/0186023 A1     Jun. 24, 2021

(30) Foreign Application Priority Data

May 19, 2017 (JP) .............................. JP2017-099583

(51) Int. Cl.
*A01N 43/90* (2006.01)

(52) U.S. Cl.
CPC ..................... *A01N 43/90* (2013.01)

(58) Field of Classification Search
None
See application file for complete search history.

(56) References Cited

U.S. PATENT DOCUMENTS

| 2011/0064827 A1 | 3/2011 | Seitz et al. |
| 2011/0118115 A1 | 5/2011 | Seitz et al. |
| 2011/0319462 A1 | 12/2011 | Seitz et al. |
| 2016/0286810 A1 | 10/2016 | Seitz et al. |
| 2018/0103634 A1* | 4/2018 | Noller .................... A01N 43/90 |

FOREIGN PATENT DOCUMENTS

| EP | 3 626 078 A1 | 3/2020 |
| JP | 2005-504530 A | 2/2005 |
| JP | 2013-504526 A1 | 2/2013 |
| JP | 2013-510895 A | 3/2013 |
| JP | 2016-510073 A | 4/2016 |
| WO | WO 03/018817 A1 | 3/2003 |
| WO | WO 2010/043319 A1 | 4/2010 |
| WO | WO 2011/029551 A2 | 3/2011 |
| WO | WO 2011/061156 A1 | 5/2011 |
| WO | 2011/128300 A2 | 10/2011 |
| WO | WO 2014/139897 A1 | 9/2014 |
| WO | 2014/179784 A2 | 11/2014 |
| WO | WO 2016/166020 A1 | 10/2016 |

OTHER PUBLICATIONS

Prasad et al. "Efflux pump proteins in antifungal resistance" Frontiers in Pharmacology, 2014, vol. 5, Article 202.*
Extended European Search Report for European Application No. 18802442.6, dated Feb. 15, 2021.
Holmes et al., "Targeting efflux pumps to overcome antifungal drug resitance," Future Medicinal Chemistry, vol. 8, No. 12, 2016, pp. 1485-1501, 17 pages total.
Indian Examination Report dated Apr. 9, 2021, for Indian Application No. 201947046309, with an English translation.
Chilean Office Action (including an English translation thereof) issued in the corresponding Chilean Patent Application No. 201903298 dated Apr. 28, 2021.
De Waard et al., "Impact of fungal drug transporters on fungicide sensitivity, multidrug resistance and virulence". Pest Manag Sci. vol. 62, 2006, pp. 195-207 (13 pages).
International Preliminary Report on Patentability and English translation of the Written Opinion of the International Searching Authority dated Nov. 19, 2019, for International Application No. PCT/JP2018/019308.
International Search Report, dated Aug. 7, 2018, for International Application No. PCT/JP2018/049308.
Leroux et al., "Activity of fungicides and modulators of membrane drug transporters in field strains of Botrytis cinera displaying multidrug resistance", Eur J Plant Pathol, vol. 135, 2013, pp. 683-692 (11 pages).
Omrane et al., "Fungicide efflux and the MgMFS1 transporter contribute to the multidrug resistance phenotype in Zymoseptoria tritici field isolates", Environmental Microbiology, vol. 17, No. 8, 2015, pp. 2805-2823 (19 pages).

* cited by examiner

Primary Examiner — Joseph R Kosack
(74) Attorney, Agent, or Firm — Birch, Stewart, Kolasch & Birch, LLP

(57) ABSTRACT

The present invention provides a method for controlling efflux type multidrug resistant plant diseases showing an excellent efficacy against efflux type multidrug resistant plant diseases, said method comprising a step of applying an effective amount of a dithiine tetracarboximide compound represented by formula (1):

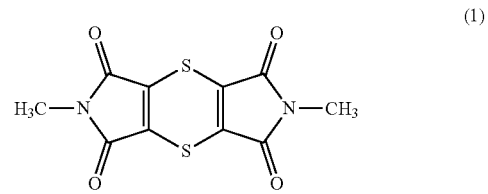

(1)

to a plant or soil where the plant grows.

6 Claims, No Drawings

METHOD FOR CONTROLLING DISCHARGE-TYPE MULTIDRUG RESISTANT PLANT DISEASES

TECHNICAL FIELD

This application claims priority to and the benefit of Japanese Patent Application No. 2017-099583 filed on May 19, 2017, the entire contents of which are incorporated herein by reference.

The present invention relates to a method for controlling an efflux type multidrug resistant plant disease.

BACKGROUND ART

Recently, frequent use of plant disease control agents results in an emergence of a particular fungus in which any resistance to a plural of plant disease control agents that have been used hereto is acquired. These fungi having any resistance acquired are said to have been acquired any resistance to a plural of plant disease control agents by mutating the site of action of the plant disease control agent (target protein) or acquiring ability to decompose the plant disease control agent.

On the other hand, it has been recently reported the presence of some fungi in which their resistances to not only plant disease control agents that have been used hereto, but also the other plant disease control agents are acquired by an acquisition of an ability to export a plant disease control agent to outside of the cells (see Non-Patent Documents 1 and 2).

CITATION LIST

Non-Patent Document

Non-Patent Document 1: Pest Management Science. 2006; 62, 195-207
Non-Patent Document 2: European Journal of Plant Pathology. 2013; 135, 683-693

SUMMARY OF THE INVENTION

Problems to be Solved by Invention

An object of the present invention is provide a method for controlling plant diseases caused by a fungus in which a resistance to a plant disease control agent is acquired by an acquisition of an ability to export a plant disease control agent to outside of the cells (hereinafter, said fungus is sometimes referred to as "efflux type multidrug resistant fungus") (hereinafter, said plant disease is sometimes referred to as "efflux type multidrug resistant plant disease").

Means to Solve Problems

The present inventors have found out a method showing an excellent control efficacy against efflux type multidrug resistant plant diseases, and as a result, that a dithiine tetracarboximide compound represented by the following formula (1) has an excellent control efficacy against efflux type multidrug resistant plant diseases.

That is, the present invention provides the followings.
[1] A method for controlling a plant disease caused by efflux type multidrug resistant fungus, said method comprising a step of applying an effective amount of a dithiine tetracarboximide compound represented by formula (1):

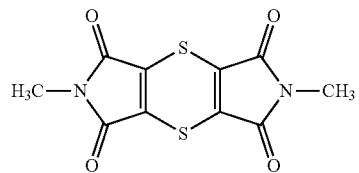

to a plant or soil where the plant grows.
[2] The method for controlling a plant disease according to [1], wherein the efflux type multidrug resistant fungus is a fungus in which a resistance to a plant disease control agent is acquired by an overexpression of one or more membrane transporters selected from the group consisting of an ABC transporter and a MFS transporter.
[3] The method for controlling a plant disease according to [1] or [2], wherein the plant disease is one or more plant diseases selected from the group consisting of wheat disease and grapes disease.
[4] The method for controlling a plant disease according to [1] or [2], wherein the efflux type multidrug resistant fungus is one or more efflux type multidrug resistant fungi selected from the group consisting of wheat *Septoria* leaf blotch fungus and grapes gray mold fungus.
[5] The method for controlling a plant disease according to any one of [1] to [4], wherein the efflux type multidrug resistant fungus is an efflux type multidrug resistant fungus having a resistance derived from a mutation of a gene encoding target protein of the plant disease control agent and/or a resistance derived from an overexpression of the target protein, said resistance being against one or more plant disease control agents selected from the group consisting of a respiratory inhibitor and a sterol biosynthesis inhibitor.
[6] The method for controlling a plant disease according to any one of [1] to [5], wherein the step of applying to a plant or soil where the plant grows is a step of applying to a seed.
[7] Use of a dithiine tetracarboximide compound represented by formula (1):

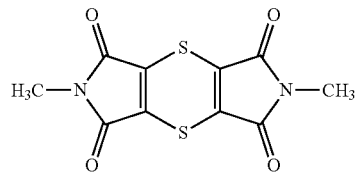

for controlling a plant disease caused by an efflux type multidrug resistant fungus.

The present invention can control efflux type multidrug resistant plant diseases.

A method for controlling efflux type multidrug resistant plant diseases of the present invention (hereinafter, referred to as "Present method" or "method of the present invention") comprises a step of applying an effective amount of the dithiine tetracarboximide compound represented by the above-mentioned formula (1) (hereinafter, referred to as "Present compound (1)" or "compound (1) of the present invention") to plants or soil where the plants grow.

Firstly, the present compound (1) is explained.

The present compound (1) represents a dithiine tetracarboximide compound represented by the following formula (1):

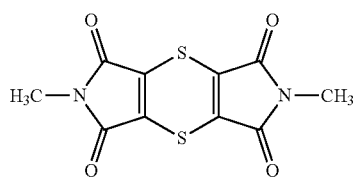

and also is described in, for example, WO 2011/128263, and may be prepared also by a method described in the document.

Although a form that is used for the present compound (1) may be the present compound (1) as itself, the present compound (1) is usually prepared by mixing with inert carrier(s), and if necessary, adding surfactants and the other auxiliary agents for formulation, to formulated into a formulation such as wettable powders, water dispersible granules, flowables, granules, dusts, dry flowables, emulsifiable concentrates, aqueous solutions, oil solutions, smoking agents, aerosols, and microcapsules (hereinafter, referred to as "present formulation" or "formulation of the present invention"). For example, in these present formulations, the present compound (1) comprises usually within a range of 0.1 to 99% by weight, preferably 0.2 to 90% by weight, further preferably 5 to 50% by weight, relative to the total weight of the formulation. The formulation may be used as itself or by adding the other inert ingredient(s), to use as an agent for controlling an efflux type multidrug resistant plant disease.

Examples of the inert carrier used on the formulation include a solid carrier and a liquid carrier.

Examples of the solid carrier include finely-divided powders or particles of clays (for example, kaolin, diatomaceous earth, synthetic hydrated silicon dioxide, Fubasami clay, bentonite and acid clay), talcs or the other inorganic minerals (for example, sericite, quartz powder, sulfur powder, activated charcoal, calcium carbonate, and hydrated silica).

Examples of the liquid carrier include water, alcohols, ketones (for example, acetone, methyl ethyl ketone, cyclohexanone), aromatic hydrocarbons (for example, benzene, toluene, xylene, ethyl benzene, methylnaphthalene), aliphatic hydrocarbons (for example, n-hexane, kerosene), esters, nitriles, ethers, acid amides, and halogenated hydrocarbons.

Examples of the surfactants include alkyl sulfates, alkyl sulfonates, alkyl aryl sulfonates, alkyl aryl ethers and polyoxyethylenated compounds thereof, polyoxyethylene glycol ethers, polyol esters, and sugar alcohol derivatives Examples of the other auxiliary agents for formulation include stickers, dispersers, and stabilizers, and specifically casein, gelatin, polysaccharides (for example, starch, gum arabic, cellulose derivatives, and alginic acid), lignin derivatives, bentonite, sugars, water-soluble synthetic polymers (for example, polyvinyl alcohol, polyvinyl pyrrolidone, and polyacrylic acids), PAP (acidic isopropyl phosphate), BHT (2,6-di-tert-butyl-4-methylphenol), BHA (a mixture of 2-tert-butyl-4-methoxyphenol and 3-tert-butyl-4-methoxyphenol), and fatty acids or esters thereof, and the others.

Also, the present formulation may be used by further mixing with various kinds of oils (such as mineral oils and vegetable oils) and/or the other surfactants and the others. Specific examples of the oils or surfactants that may be mixed to use include Nimbus (Registered trade mark), Assist (Registered trade mark), Aureo (Registered trade mark), Iharol (Registered trade mark), Silwet L-77 (Registered trade mark), BreakThru (Registered trade mark), Sundancell (Registered trade mark), Induce (Registered trade mark), Penetrator (Registered trade mark), AgriDex (Registered trade mark), Lutensol A8 (Registered trade mark), NP-7 (Registered trade mark), Triton (Registered trade mark), Nufilm (Registered trade mark), Emulgator NP7 (Registered trade mark), Emulad (Registered trade mark), TRITON 45 (Registered trade mark), AGRAL 90 (Registered trade mark), AGROTIN (Registered trade mark), ARPON (Registered trade mark), EnSpray N (Registered trade mark), BANOLE (Registered trade mark) and the others.

In the method of the present invention, the present compound (1) may be used in combination with one or more compounds selected from the group consisting of other compounds having plant disease control activity and compounds having insecticidal activity.

The method of the present invention is conducted by applying an effective amount of the present compound (1) to plants or soil where the plants grow. Examples of the plant include foliage of the plant, seeds of the plant, bulbs of the plant, and the others. Here the bulbs refer to a discoid stem, a corm, a rhizome, a tuber, a tuberous root, a rhizophore, and the like.

An application method of the present compound (1) is not particularly limited as long as the application form thereof is a substantial applicable form of the present compound (1), and includes, for example, an application to plant body (such as foliar spraying), an application to places where plants are grown (such as soil treatment), an application to seeds (such as seed disinfection), and the others.

Examples of the foliar treatment include a method of applying active ingredients to stems and leaves of plant to be grown.

Examples of the root treatment include a method of soaking an entire or a root of the plant into a chemical solution comprising the present compound (1), and a method of attaching a solid formulation comprising the present compound (1) and solid carrier to a root of the plant.

Examples of the soil treatment include spraying onto soil, admixing with soil, and irrigating a chemical solution to soil.

Examples of the seed treatment include an application of the present compound (1) to a seed or a bulb of the plant to be prevented from the plant disease, specifically, for example, a spray treatment by spraying a mixed solution of the formulation comprising the present compound (1) and water in a mist form onto a surface of a seed or a surface of a bulb, a smear treatment by applying the wettable powder, the emulsifiable concentrate or the flowable formulation each comprising the present compound (1) with added by small amounts of water or as itself to a seed or a bulb, an immersion treatment by immersing a seed into a solution of the present compound (1) for a certain period of time, a film-coating treatment, and a pellet-coating treatment.

In the method of the present invention, the application amount of the present compound (1) may be changed depending on the kind of plant to be treated, the kind and the occurring frequency of the plant disease to be controlled, formulation form, treatment period, treatment method, treatment places, weather conditions, and the others, and in the case of applying to stems and leaves of the plant or soil where the plant grows, the amount of the present compound (1) per 1,000 $m^2$ is usually 1 to 500 g, preferably 5 to 50 g.

In the case where the formulation form is emulsifiable concentrates, wettable powders or flowables and the like, these formulations are usually diluted with water, and then applied by spraying. In these cases, the concentration of the present compound (1) is usually 0.0005 to 2% by weight, preferably 0.001 to 1% by weight. The dusts or granules are usually applied as itself without diluting them.

The term of "efflux type multidrug resistant fungus" as used herein represents a fungus showing a resistance to multiple agents for controlling plant disease by overexpressing various kinds of membrane transporters that are present on the cell membrane, and increasing an efflux pump function in exporting the plant disease control agent that is inflowed into cells outside of the cells. Examples of the membrane transporter include an ABC transporter and a MFS transporter, which are not limited thereto. As used herein, "ABC transporter" refers to an ATP-binding cassette transporter, and "MFS transporter" refers to a Major Facilitator Superfamily transporter. The overexpression of the membrane transporter is confirmed by usual method, for example, by measuring an amount of the membrane transporter or an amount of mRNA which corresponds to a gene encoding the membrane transporter. The amount of said mRNA is measured, for example, by a quantitative reverse transcription polymerase chain reaction (qRT-PCR). More specifically, the measurement method is disclosed in the following publicly known references.

Environmental Microbiology. 2015; 17(8), 2805-2823
Pest Management Science. 2001; 57(5), 393-402
PLos Pathogen., 2009; December; 5(12): e1000696

It is sufficient that the efflux type multidrug resistant fungus shows any resistance to a plant disease control agent as a result of the overexpression of the membrane transporter regardless of the measured amount of mRNA. The measured amount of mRNA may be, for example, 20 fold, 50 fold, further 100 fold or more, relative to the mRNA amount of wild-type fungus. Alternatively, as below-mentioned herein, an $EC_{50}$ value ratio is calculated by dividing an $EC_{50}$ value against the efflux-type multidrug resistant fungus strain by an $EC_{50}$ value against the wild-type fungus strain, and as a result, it is sufficient that the $EC_{50}$ value ratio of tolnaftate shows 3 fold or more, preferably 10 fold or more, by using tolnaftate known as an indicator of the efflux type multidrug resistant fungus.

The method of the present invention can be applied to control a plant disease that is caused by an efflux type multidrug resistant fungus. As aforementioned, the method of the present invention is conducted by applying an effective amount of the present compound (1) to a plant or soil where the plant grows. An example of the plant includes a plant in which any plant disease that is caused by an efflux type multidrug resistant fungus is occurred, and a plant in which any plant disease that is caused by an efflux type multidrug resistant fungus may be occurred.

The efflux type multidrug resistant fungus may have a resistance derived from a mutation of a gene encoding target protein of various kinds of the plant disease control agent and/or a resistance derived from an overexpression of the target protein. Also, the target protein that has a mutation in a gene or is overexpressed may be plural kinds thereof, provided that the target protein does not have a resistance to the present compound (1), said resistance being derived from a mutation of a gene encoding target protein of the present compound (1).

Examples of the above-mentioned various kinds of plant disease control agent include nucleic acid synthesis inhibitors (such as phenylamide fungicides, and acylamino acid fungicides), mitosis and cell division inhibitors (such as MBC fungicides, and N-phenylcarbamate fungicides), respiratory inhibitors (such as QoI fungicides, QiI fungicides, and SDHI fungicides), inhibitors of amino synthesis and protein synthesis (such as anilinopyrimidine fungicides), signal transduction inhibitors (such as phenylpyrrole fungicides, and dicarboximide fungicides), inhibitors of lipid synthesis and cell membrane synthesis (such as phosphorothiorate fungicides, dithiolane fungicides, aromatic hydrocarbon fungicides, heteroaromatic fungicides, and carbamate fungicides), sterol biosynthesis inhibitors (such as DMI fungicides (such as triazole fungicides), hydroxyanilide fungicides, and aminopyrazolinone fungicides), cell wall synthesis inhibitors (such as polyoxin inhibitors, and carboxylic acid amide fungicides), melanin synthesis inhibitors (such as MBI-R fungicides, MBI-D fungicides, and MBI-P fungicides), as well as the other fungicides (such as cyanoacetamide oxime fungicides, and phenylacetamide fungicides), preferably one or more plant disease control agents selected from the group consisting of respiratory inhibitor and sterol biosynthesis inhibitor. Examples of mutation site of gene encoding the above-mentioned target protein in each plant disease fungus include those indicated in Table 1 below.

TABLE 1

| | Genes encoding target protein of various kinds of plant disease control agent | | | | | | | | |
|---|---|---|---|---|---|---|---|---|---|
| pathogenic fungi (scientific name) | cytochrome b | Cyp51 | β-tubulin | CesA3 | SdhB | SdhC | SdhD | OS-1 | ERG27 |
| *Ajellomyces capsulatus* | | Y136F | | | | | | | |
| *Alternaria alternata* | G143A | | | | H277R/Y | H134R | H133R | | |
| *Alternaria brassicicola* | | | | | | | | | E753K |
| *Alternaria longipes* | | | | | | | | | G420D |
| *Alternaria arborescens* | G143A | | | | | | | | |
| *Alternaria solani* | F129L | | | | H277R/Y | | H133R | | |
| *Alternaria tomato* | G143A | | | | | | | | |
| *Aspergillus flavus* | | Y132N, K197N, D282E, M288L, T469S, | | | | | | | |

TABLE 1-continued

Genes encoding target protein of various kinds of plant disease control agent

| pathogenic fungi (scientific name) | cytochrome b | Cyp51 | β-tubulin | CesA3 | SdhB | SdhC | SdhD | OS-1 | ERG27 |
|---|---|---|---|---|---|---|---|---|---|
| Aspergillus fumigatus | | H399P, D411N, T454P N22D, S52T, G54E/K/R/V/W, Y68, Q88H, L98H, V101F, Y121F, N125I, G138C/R/S, Q141H, H147Y, P216L, F219S, M220K/I/T/V, T289A, S297T, P394L, Y431C, G432S, G434C, T440A, G448S, Y491H, F495I | | | | | | | |
| Emericella nidulans | | | Q134K, E198D/K/Q, F200Y | | | | | | |
| Aspergillus parasiticus | | G54W | | | | | | | |
| Botryotinia fuckeliana | G143A | | E198A/G/K/V, F200Y | | P225H/F/L/T, N230I, H272L/R/V/Y | P80H/L, A85V | H132R | I365N/R/S, V368F, Q369H/P, N373S, T447S | S9G, F26S, P57A, T63I, G170R, V192I, L195F, N196T, A210G, I232M, P238S/Δ, P250S, P269L P298Δ, V309M, A314V, S336C, V365A, E368D, N369D, E375K, A378T, L400F/S, Y408S, F412I/S/V/C, A461S, R496T |
| Candida albicans | | A61V, Y132F/H, K143E, S405F, F449S, G4S4S, R467K, I471T | | | | | | | |
| Cochliobolus heterostrophus | | | | | | | | | |
| Glomerella graminicola | G143A | | | | | | | | |
| Corynespora cassiicola | G143A | | | | | S73P | S89P, G109V | | |

TABLE 1-continued

Genes encoding target protein of various kinds of plant disease control agent

| pathogenic fungi (scientific name) | cytochrome b | Cyp51 | β-tubulin | CesA3 | SdhB | SdhC | SdhD | OS-1 | ERG27 |
|---|---|---|---|---|---|---|---|---|---|
| Cercospora beticola | G143A | E297K, I330T, P384S | E198A | | | | | | |
| Cercospora sojina | G143A | | | | | | | | |
| Cladsporium carpophilum | G143A | | | | | | | | |
| Colletotrichum graminicola | G143A | | | | | | | | |
| Glomerella cingulata | G143A | | | | | | | | |
| Stagonosporopsis cucurbitacearum | | | | | H277R/Y | | | | |
| Blumeria graminis f. sp. hordei | G143A | Y136F, K147Q, S509T | | | | | | | |
| Blumeria graminis f. sp. tritici | G143A | S79T, Y136F, K175N | | | | | | | |
| Eurotium oryzae | | | | | H249L/N/Y | T90I | D124E | | |
| Filobasidiella neoformans | | Y145F, G484S | | | | | | | |
| Gibberella fujikuroi | | | E198V, F200Y | | | | | | |
| Gibberella zeae | | | E198K/L/Q, F200Y | | | | | | |
| Helminthosporium solani | | | E198A/Q | | | | | | |
| Hypomyces odoratus | | | | | | | | | |
| Parastagonospora nodorum | G143A | | | | | | | | |
| Monographella nivalis | G143A | | | | | | | | |
| Monilinia fructicola | | Y136F | E198A/K | | | | | | |
| Monilinia laxa | | | | | | | | | |
| Microdochium majus, nivale | G143A | | | | | | | | |
| Mycosphaerella fijiensis | G143A | Y136F, A313G, A381G, Y461D, G462A, Y463D/H/N | | | | | | | |
| Didymella rabiei | G143A | | | | | | | | |
| Neurospora crassa | | | E198G | | | | | | |
| Penicillium aurantiogriseum | | | E198A/K, F200Y | | | | | | |
| Penicillium expansum | | | E198A/K/V | | | | | | |
| Penicillium italicum | | | E198K, F200Y | | | | | | |
| Phakopsora pachyrhizi | F129L | F120L, Y131F/H, K142R, I145F, I475T | | | | I86F | | | |
| Phytophthora capsici | | | | Q1077K, V1109L/M | | | | | |
| Phytophthora drechsleri | | | | V1109L | | | | | |
| Phytophthora infestans | | | | G1105A/V, V1109L | | | | | |
| Plasmopara viticola | F129L G143A | | | G1105S/V | | | | | |
| Pleospora allii | G143A | | | | | | | F267L, L290S, T765R, Q777R | |

TABLE 1-continued

| | Genes encoding target protein of various kinds of plant disease control agent | | | | | | | | |
|---|---|---|---|---|---|---|---|---|---|
| pathogenic fungi (scientific name) | cytochrome b | Cyp51 | β-tubulin | CesA3 | SdhB | SdhC | SdhD | OS-1 | ERG27 |
| Podosphaera fusca | G143A | | | | | | | | |
| Podosphaera xanthii | G143A | | | | | | | | |
| Pseudoperonospora cubensis | G143A | | | G1105V/W | | | | | |
| Puccinia triticina | | Y134F | | | | | | | |
| Magnaporthe oryzae | F129L G143A | | | | | | | | |
| Pyrenophora teres | F129L | | | | H277Y | K49E, R64K, N75S, G79R, H134R, S135R | D124E/N, H134R, G138V, D145G | | |
| Pyrenophora tritici-repentis | F129L G137R G143A | | | | | | | | |
| Pyrenopeziza brassicae | | S508T | | | | | | | |
| Pythium aphanidermatum | F129L | | | | | | | | |
| Thanatephorus cucumeris | F129L G143A | | | | | | | | |
| Ramularia collo-cygni | G143A | | | | | N87S, H146R, H153R | | | |
| Rhynchosporium secalis | G143A | | E198G/K, F200Y | | | | | | |
| Rhizoctonia solani | F129L | | | | | | | | |
| Saccharomyces cerevisiae | | Y140F/H | | | | | | | |
| Sclerotinia homoeocarpa | | | E198A/K | | | | | | |
| Sclerotinia sclerotiorum | | | E198A | | H273Y | H146R | H132R | | |
| Zymoseptoria tritici | F129L G137R G143A | L50S, D107V, D134G, V136A/C/G, Y137F, M145L, N178S, S188N, S208T, N284H, H303Y, A311G, G312A, A379G, I381V/Δ, A410T, G412A Y459C/D/N/S/P/Δ, G460D/Δ, Y461D/H/S, V490L, G510C, N513K, S524T | | | N225I/T, H273Y, T268I/A, I269V | I29V, N33T, N34T, T79I/N, W80S, A84V, N86K/S/A, G90R, R151T/S, H152R, I161S | I50F, M114V, D129E | | |
| Erysiphe necator | G143A | Y136F | | | H242R | G169D | | | |
| Ustilago maydis | | | | | H257L | | | | |
| Venturia inaequalis | G143A | | E198A/K, F200Y | | T253I | H151R | | | |

The efflux type multidrug resistant fungus may be a wheat *Septoria* leaf blotch fungus which shows an efflux type multidrug resistance, and has one or more mutation sites of genes selected from the group consisting of the following (A), (B), (C-1), (C-2) and (C-3).

(A) genes encoding cytochrome b: F129L, G137R, G143A;

(B) genes encoding Cyp51: L50S, D107V, D134G, V136A/C/G, Y137F, M145L, N178S, S188N, S208T, N284H, H303Y, A311G, G312A, A379G, I381V/L, A410T, G412A, Y459C/D/N/S/P/L, G460D/Δ, Y461D/H/S, V490L, G510C, N513K, S524T;

(C-1) genes encoding SDHB: N225I/T, H273Y, T268I/A, I269V;

(C-2) genes encoding SDHC: I29V, N33T, N34T, T79I/N, W80S, A84V, N86K/S/A, G90R, R151T/S, H152R, I161S;

(C-3) genes encoding SDHD: 150F, M114V, D129E.

The efflux type multidrug resistant fungus may be a grapes gray mold fungus which shows an efflux type multidrug resistance, and has one or more mutation sites of genes selected from the group consisting of the following (D), (E-1), (E-2) and (E-3).

(D) genes encoding cytochrome b: G143A;

(E-1) genes encoding SDHB: P225H/F/L/T, N230I, H272L/R/V/Y;

(E-2) genes encoding SDHC: P80H/L, A85V (E-3) genes encoding SCHD: H132R.

The present compound (1) may be used as an agent for controlling efflux type multidrug resistant plant disease in agricultural lands such as paddy fields, fields, turfs, and orchards. The method of the present invention may be applied to agricultural lands where the following "plants" are grown.

Crops:

corn, rice, wheat, barley, rye, oat, sorghum, cotton, soybean, peanut, buckwheat, beet, rapeseed, sunflower, sugar cane, tobacco, and the others;

Vegetables:

solanaceous vegetables (for example, eggplant, tomato, pimento, pepper or potato), cucurbitaceous vegetables (for example, cucumber, pumpkin, zucchini, water melon or melon), cruciferous vegetables (for example, Japanese radish, white turnip, horseradish, kohlrabi, Chinese cabbage, cabbage, leaf mustard, broccoli, cauliflower), asteraceous vegetables (for example, burdock, crown daisy, artichoke or lettuce), liliaceous vegetables (for example, green onion, onion, garlic or asparagus), ammiaceous vegetables (for example, carrot, parsley, celery or parsnip), chenopodiaceous vegetables (for example, spinach or Swiss chard), lamiaceous vegetables (for example, *Perilla frutescens*, mint or basil), strawberry, sweet potato, *Dioscorea japonica, colocasia* or the others;

Flowers:

Ornamental foliage plants:

Lawn:

Fruits:

pomaceous fruits (for example, apple, pear, Japanese pear, Chinese quince or quince), stone fleshy fruits (for example, peach, plum, nectarine, *Prunus* mume, cherry fruit, apricot or prune), citrus fruits (for example, Citrus unshiu, orange, lemon, lime or grapefruit), nuts (for example, chestnut, walnuts, hazelnuts, almond, pistachio, cashew nuts or macadamia nuts), berry fruits (for example, blueberry, cranberry, blackberry or raspberry), grape, kaki persimmon, olive, Japanese plum, banana, coffee, date palm, coconuts, oil palm and the others;

Trees other than fruit trees:

tea, mulberry, flowering plant, roadside trees (for example, ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea*, and *Taxus* cuspidate);

and the others.

The above-mentioned "plant" may include genetically modified crops.

Examples of an efflux type multidrug resistant plant disease on which the present compound (1) can be controlled include a plant disease caused by plant pathogens such as filamentous fungus, and specific examples thereof include the followings, however which are not limited thereto.

Rice diseases: blast (*Magnaporthe grisea*), brown spot (*Cochliobolus miyabeanus*), and sheath blight (*Rhizoctonia solani*);

Wheat diseases: powdery mildew (*Erysiphe graminis*), rust (*Puccinia striiformis, P. graminis, P. triticina*), snow mould (Micronectriella *nivale, M. majus*), typhulasnow blight (T hula sp.), eyespot (Pseudocercosporella herpotrichoides), leaf blotch (Zymoseptoria *tritici*), tan spot (*Pyrenophora tritici*-repentis), *rhizoctonia* seedling blight (*Rhizoctonia solani*), and take all disease (*Gaeumannomyces graminis*);

Early diseases: powdery mildew (*Erysiphe graminis*), rust (*Puccinia striiformis, P. graminis, P. hordei*), scald (*Rhynchosporium secalis*), net blotch (*Pyrenophora teres*), spot blotch (*Cochliobolus sativus*), leaf stripe (*Pyrenophora graminea*), Ramularia disease (Ramularia collo-*cygni*), and *rhizoctonia* seeding blight (*Rhizoctonia solani*);

Corn diseases: rust (*Puccinia sorghi*), southern rust (*Puccinia polysora*), northern leaf blight (*Setosphaeria turcica*), tropical rust (Physopella *zeae*), southern leaf blight (*Cochliobolus heterostrophus*), and gray leaf spot (*Cercospora zeae-maydis*);

Cotton diseases: grey mildew (Ramuraria areola);

Coffee diseases: rust (*Hemileia vastatrix*), and leaf spot (*Cercospora coffeicola*);

Sugar cane diseases: rust (*Puccinia* melanocephela, *Puccinia kuehnii*);

Sunflower diseases: rust (*Puccinia helianthi*);

Citrus diseases: melanose (*Diaporthe citri*), scab (*Elsinoe fawcetti*), and fruit rot (*Penicillium digitatum, P. italicum*);

Apple diseases: blossom blight (*Monilinia mali*), powdery mildew (*Podosphaera leucotricha*), scab (*Venturia inaequalis*), brown spot (Diplocarpon *mali*), ring spot (*Botryosphaeria* berengeriana);

Pear diseases: scab (*Venturia nashicola*, V. *pirina*), and rust (*Gymnosporangium haraeanum*);

Peach diseases: brown rot (*Monilinia Fructicola*), scab (*Cladosporium carpophilum*), and *Phomopsis* rot (*Phomopsis* sp.);

Grapes diseases: anthracnose (*Elsinoe ampelina*), ripe rot (*Glomerella cingulata*), powdery mildew (*Uncinula necator*), rust (*Phakopsora ampelopsidis*), and black rot (*Guignardia bidwellii*);

Diseases of Japanese persimmon: leaf spot (*Cercospora kaki, Mycosphaerella nawae*);

Diseases of gourd family: powdery mildew (*Sphaerotheca fuliginea*), gummy stem blight (*Didymella bryoniae*), and target spot (*Corynespora cassiicola*);

Tomato diseases: leaf mold (*Cladosporium fulvum*), leaf mold (*Pseudocercospora fuligena*), late blight (*Phytophthora infestans*), and powdery mildew (*Leveillula taurica*);

Eggplant diseases: brown spot (*Phomopsis vexans*) and powdery mildew (*Erysiphe cichoracearum*);

Welsh onion diseases: rust (*Puccinia allii*);

Soybean diseases: purple stain (*Cercospora kikuchii*), rust (*Phakopsora pachyrhizi*), target spot (*Corynespora cassiicola*), Rhizoctonia aerial blight (*Rhizoctonia solani*), septoria brown spot (*Septoria glycines*), frog eye leaf spot (*Cercospora sojina*), and Powdery mildew (*Microsphaera diffusa*)

Kindney bean diseases: rust (*Uromyces appendiculatus*);

Peanut diseases: early leaf spot (*Cercospora personata*), and late leaf spot (*Cercospora arachidicola*);

Garden pea diseases: powdery mildew (*Erysiphe pisi*);

Strawberry diseases: powdery mildew (*Sphaerotheca humuli*);

Sugar beet diseases: *cercospora* leaf spot (*Cercospora beticola*), leaf blight (*Thanatephorus cucumeris*), and root rot (*Thanatephorus cucumeris*);

Rose diseases: powdery mildew (*Sphaerotheca pannosa*);

Diseases of *Chrysanthemum*: leaf blight (*Septoria chrysanthemi*-indici);

Onion diseases: botrytis leaf blight (*Botrytis cinerea, B. byssoidea, B. squamosa*), gray-mold neck rot (*Botrytis alli*), and small sclerotial rot (*Botrytis squamosa*);

Diseases of various crops: gray mold (*Botrytis cinerea*);

Turfgrass diseases: brown patch and large patch (*Rhizoctonia solani*); and

Banana diseases: Sigatoka disease (*Mycosphaerella fijiensis, Mycosphaerella musicola*).

EXAMPLES

Hereinafter, the present method is explained in more detail by using Formulation Examples and Test Examples.

The Formulation Examples which are used in the present method are shown below. The "parts" in the Formulation Examples represents "part by weight".

Formulation Example 1

Fifty (50) parts of the present compound (1), 3 parts of calcium lignin sulfonate, 2 parts of magnesium lauryl sulfate, and 45 parts of synthetic hydrated silicon oxide are well mixed-grinding to obtain a wettable powder.

Formulation Example 2

Twenty (20) parts of the present compound (1) and 1.5 parts of sorbitan trioleate are mixed with 28.5 parts of water containing 2 parts of polyvinyl alcohol, and the mixture is then finely-ground by a wet grinding method. To this mixture, 40 parts of water containing 0.05 parts of xanthan gum and 0.1 parts of aluminum magnesium silicate is added, and 10 parts of propylene glycol is further added thereto. The mixture is stirred to obtain a flowable.

Formulation Example 3

Two (2) parts of the present compound (1), 88 parts of kaolin clay and 10 parts of talc are well mixed-grinding to obtain a dust.

Formulation Example 4

Five (5) parts of the present compound (1), 14 parts of polyoxyethylene styryl phenyl ether, 6 parts of calcium dodecylbenzene sulfonate, and 75 parts of xylene are mixed well to obtain an emulsifiable concentrate.

Formulation Example 5

Two (2) parts of the present compound (1), 1 part of synthetic hydrated silicon oxide, 2 parts of calcium lignin sulfonate, 30 parts of bentonite, and 65 parts of kaolin clay are well mixed-grinding, and thereto are added water, and the mixture is well kneaded and is then granulated and dried to obtain a granule.

Formulation Example 6

Twenty (20) parts of the present compound (1), 35 parts of a mixture of white carbon and ammonium polyoxyethylene alkyl ether sulfate (weight ratio is 1:1) and appropriate amount of water is mixed to make the total amount thereof 100 parts, and the mixture is then finely-ground with a grinder to obtain a flowable.

Formulation Example 7

Each of the starting materials described in Table 2 were mixed at a prescribed weight ratio thereof described in Table 2, respectively, and then were stirred to make a homogeneous solution, to obtain each formulation. Here the numerical number described in Table 2 represents "part by weight".

TABLE 2

|  | 1 | 2 | 3 | 4 | 5 | 6 | 7 | 8 | 9 | 10 | 11 |
|---|---|---|---|---|---|---|---|---|---|---|---|
| Present compound (1) | 10.0 | 10.0 | 10.0 | 10.0 | 10.0 | 6.0 | 6.0 | 6.0 | 6.0 | 6.0 | 6.0 |
| Agnique AMD810 | 15.0 | 3.0 | 30.0 |  |  | 20.0 |  | 20.0 | 20.0 | 20.0 | 20.0 |
| Hallcomid M-8-10 |  |  |  |  |  |  | 20.0 |  |  |  |  |
| Agnique AMD3L |  |  |  | 20.0 | 30.0 |  |  |  |  |  |  |
| Solvesso 200ND | 40.0 | 40.0 | 10.0 | 10.0 | 39.5 | 24.0 | 19.5 | 24.5 | 31.5 | 14.5 | 14.5 |
| Benzyl alcohol |  | 7.0 |  |  |  |  |  |  |  |  |  |
| Calsogen 4814 | 3.5 | 3.5 | 3.5 | 3.5 | 3.5 | 3.5 | 3.5 | 3.5 | 3.5 | 3.5 | 3.5 |
| ATPLUS245 | 6.5 | 6.5 | 6.5 | 4.0 | 4.0 | 6.5 | 4.0 |  | 4.0 |  |  |
| Brij O3 |  |  |  |  |  |  |  | 5.0 |  | 5.0 | 5.0 |
| Atlas G5002L |  |  |  |  |  |  | 2.0 | 1.0 |  | 1.0 | 1.0 |
| Toximul 8323 |  |  |  | 5.0 | 5.0 |  |  |  | 5.0 |  |  |
| Rhodiasolv Polarclean |  | 30.0 |  | 39.5 |  | 40.0 | 45.0 | 40.0 | 20.0 |  |  |
| PURASOLV ML |  |  |  |  |  |  |  |  |  | 50.0 |  |

TABLE 2-continued

|  | 1 | 2 | 3 | 4 | 5 | 6 | 7 | 8 | 9 | 10 | 11 |
|---|---|---|---|---|---|---|---|---|---|---|---|
| PURASOLV EL |  |  |  |  |  |  |  |  |  |  | 50.0 |
| N,N'-dimethyl propylene urea | 25.0 |  |  | 8.0 | 8.0 |  |  |  | 10.0 |  |  |
| γ-butyl lactone |  |  | 40.0 |  |  |  |  |  |  |  |  |
| Total | 100 | 100 | 100 | 100 | 100 | 100 | 100 | 100 | 100 | 100 | 100 |

The product names described in the above Table 2 are as follows.

Agnique AMD810: a mixture of N,N-dimethyl octanamide and N,N-dimethyl decanamide (manufactured by BASF Corporation);

Hallcomid M-8-10: a mixture of N,N-dimethyl octanamide and N,N-dimethyl decanamide (manufactured by Stepan Company);

Agnique AMD3L: N,N-dimethyl lactamide (manufactured by BASF Corporation);

Sorbesso 200ND: mainly C11-14 alkylnaphthalene as aromatic hydrocarbon (manufactured by Exxon Mobil Corporation);

Calsogen 4814: calcium dodecylbenzene sulfonate (manufactured by Clariant International Ltd.);

ATPLUS245: polyoxyethylene polyoxypropylene alkyl ether (manufactured by Croda International plc);

Brij O3: polyoxyethylene oleyl ether, HLB: 7 (manufactured by Croda International plc);

Atlas G5002L: butyl block copolymer (manufactured by Croda International plc);

Toximul 8323: polyoxyethylene polyoxypropylene block copolymer (manufactured by Stepan Company);

Rhodiasolv Polarclean: containing 80 to 90% by weight of methyl 5-(dimethylamino)-2-methyl-5-oxopentanoate (provided that the total amount is deemed 100% by weight) (manufactured by Solvay Nicca, Ltd.);

PURASOLV ML: methyl L-lactate (manufactured by Corbion purac.);

PURASOLV EL: ethyl L-lactate (manufactured by Corbion purac.).

Next, Test Examples are shown below. The efflux type multidrug resistant fungi strains which were used in the following Test Examples are all fungus strains that are maintained and managed in-house of the applicant and also are deposited to NITE Patent Microorganisms Depositary (NPMD) in the NITE Patent Microorganisms Depositary (NPMD) (Address: 2-5-8, Kazusakamatari, Kisarazu-shi, Chiba, Japan) filed on Apr. 10, 2018. Each of the fungi strain names are indicated as an NITE accession number together with an in-house management codes, respectively.

Test Example 1

Control test against Efflux type multidrug resistant wheat Septoria leaf blotch fungus (Zymoseptoria tritici)

Each of the present compound (1) and tolnaftate was diluted with dimethyl sulfoxide to a prescribed concentration thereof, respectively. Each of the chemical solutions comprising the respective testing compound was dispensed into a titer plate (with 96 wells) in the amount of 1 µL. Thereto was then dispensed 150 µL of a potato dextrose broth (PDB culture media) to which each conidia of wheat Septoria leaf blotch fungus (efflux type multidrug resistant fungus strains) (fungus strain name: St 106-6 as in-house management codes) or wild-type fungus strain, respectively, was inoculated in advance. The plate was cultured at 18° C. for 4 days, thereby allowing each wheat Septoria leaf blotch fungus to undergo proliferation, and the absorbance at 600 nm of each well of the titer plate was then measured to determine a degree of growth of the wheat Septoria leaf blotch fungus (treated group). On the other hand, each of the groups where the wild-type fungus strain or the efflux type multidrug resistant wheat Septoria leaf blotch fungus strain was grown except that the chemical solution was replaced with dimethyl sulfoxide were made non-treated group, respectively, and then the degree of growth thereof was examined (non-treated group).

The efficacy was calculated from the degree of the growth by the below-mentioned "Equation 1", and then each $EC_{50}$ value of the testing compound, respectively against the efflux type multidrug resistant fungus strains and the wild-type fungus strain was calculated. Next, as shown in the below-mentioned "Equation 2", an $EC_{50}$ value ratio was calculated by dividing an $EC_{50}$ value against the efflux type multidrug resistant fungus strains by an $EC_{50}$ value against the wild-type fungus strain.

The test results are shown in Table 3. The $EC_{50}$ value ratio for tolnaftate was high of 19, while the $EC_{50}$ value ratio for the present compound (1) was low of 1.1. From the test results, it was suggested that the present compound (1) shows an equivalental degree of control efficacy against the efflux type multidrug resistant fungus strains to that against the wild-type fungus strain.

$$\text{Efficacy} = 100 \times (X-Y)/X \qquad \text{"Equation 1"}$$

X: Degree of growth of fungus in non-treated group
Y: Degree of growth of fungus in treated group $$EC_{50} \text{ value ratio} = EC_{50} \text{ value against efflux type multidrug resistant fungus strain}/EC_{50} \text{ value against wild-type fungus strain} \qquad \text{"Equation 2"}$$

[Table 6]

TABLE 3

|  | $EC_{50}$ value (ppm) | | |
|---|---|---|---|
| Compound Name | Wild-type fungus strain | Efflux type multidrug resistant fungus strain | $EC_{50}$ value ratio |
| Present compound (1) | 1.2 | 1.3 | 1.1 |
| Tolnaftate | 0.51 | >10 | >19 |

Test Example 2

Control Test Against Efflux Type Multidrug Resistant Grapes Gray Mold Fungus (Botrytis cinerea)

Each of the present compound (1), fludioxonil and tolnaftrate was diluted with dimethyl sulfoxide to a prescribed concentration thereof, respectively. Each of the chemical solutions comprising the respective testing compound was dispensed into a titer plate (with 96 wells) in the amount of 1 µL. Thereto was then dispensed 150 µL of a potato dextrose broth (PDB culture media) to which each conidia of grapes gray mold fungi, that is, efflux type multidrug resistant fungus strains (specifically, efflux type multidrug resistant fungus strain 1: ABC transporter-overexpressing fungus strain (fungus strain name: NITE accession number (NITE BP-02676), in-house management codes (Bc-56)); efflux type multidrug resistant fungus strain 2: MFS transporter-overexpressing fungus strain (fungus strain name: NITE accession number (NITE BP-02678), in-house management codes (Bc-107)); and efflux type multidrug resistant fungus strain 3: ABC transporter and MFS transporter-overexpressing fungus strain (fungus strain name: NITE accession number (NITE BP-02677), in-house management codes (Bc-103))) or wild-type fungus strain, respectively, was inoculated in advance. The plate was cultured at 18° C. for 2 days, thereby allowing each grapes gray mold fungus to undergo proliferation, and the absorbance at 600 nm of each well of the titer plate was then measured to determine a degree of growth of each of the grapes gray mold fungi (treated group). On the other hand, each of the groups where the wild-type fungus strain or the efflux type multidrug resistant grapes gray mold fungus strains was grown except that the chemical solution was replaced with dimethyl sulfoxide were made non-treated group, respectively, and then the degree of the growth thereof was examined (non-treated group).

The efficacy was calculated from the degree of the growth by the below-mentioned "Equation 1", and then each $EC_{50}$ value of the testing compound, respectively against the efflux type multidrug resistant fungus strains and the wild-type fungus strain was calculated. Also, an $EC_{50}$ value ratio was calculated by the above-mentioned "Equation 2".

The test results are shown in Table 4. The $EC_{50}$ value ratio for fludioxonil was high of 23, 14 or 43, respectively, and the every $EC_{50}$ value ratio for tolnaftate was also high of more than 4.5, while the $EC_{50}$ value ratio of the present compound (1) was low of 0.89, 0.89 or 1.3, respectively. From the test results, it was suggested that the present compound (1) shows an equivalently degree of control efficacy against the efflux type multidrug resistant fungus strains to that against the wild-type fungus strain.

TABLE 4

| Compound Name | $EC_{50}$ value (ppm) | | | | $EC_{50}$ value ratio | | |
|---|---|---|---|---|---|---|---|
| | Wild-type fungus strain | Efflux type multidrug resistant fungus strain | | | | | |
| | | 1 | 2 | 3 | 1 | 2 | 3 |
| Present compound (1) | 1.9 | 1.7 | 1.7 | 2.4 | 0.89 | 0.89 | 1.3 |

TABLE 4-continued

| Compound Name | $EC_{50}$ value (ppm) | | | | $EC_{50}$ value ratio | | |
|---|---|---|---|---|---|---|---|
| | Wild-type fungus strain | Efflux type multidrug resistant fungus strain | | | | | |
| | | 1 | 2 | 3 | 1 | 2 | 3 |
| Fludioxonil | 0.0085 | 0.19 | 0.12 | 0.36 | 23 | 14 | 43 |
| Tolnaftate | 2.2 | >10 | >10 | >10 | >4.5 | >4.5 | >4.5 |

The invention claimed is:

1. A method for controlling a plant disease caused by efflux type multidrug resistant fungus, said method comprising a step of applying an effective amount of a dithiine tetracarboximide compound represented by formula (1):

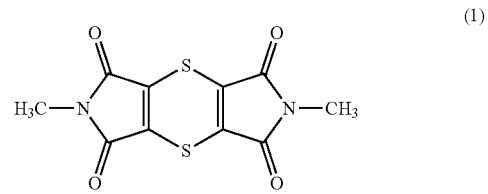

to a plant or soil where the plant grows.

2. The method for controlling a plant disease according to claim 1, wherein the efflux type multidrug resistant fungus is a fungus in which a resistance to a plant disease control agent is acquired by an overexpression of one or more membrane transporters selected from the group consisting of an ABC transporter and a MFS transporter.

3. The method for controlling a plant disease according to claim 1, wherein the plant disease is one or more plant diseases selected from the group consisting of wheat disease and grapes disease.

4. The method for controlling a plant disease according to claim 1, wherein the efflux type multidrug resistant fungus is one or more efflux type multidrug resistant fungi selected from the group consisting of wheat *Septoria* leaf blotch fungus and grapes gray mold fungus.

5. The method for controlling a plant disease according to claim 1, wherein the efflux type multidrug resistant fungus is an efflux type multidrug resistant fungus having a resistance derived from a mutation of a gene encoding target protein of the plant disease control agent and/or a resistance derived from an overexpression of the target protein, said resistance being against one or more plant disease control agents selected from the group consisting of a respiratory inhibitor and a sterol biosynthesis inhibitor.

6. The method for controlling a plant disease according to claim 1, wherein the step of applying to a plant or soil where the plant grows is a step of applying to a seed.

* * * * *